July 21, 1936.   J. K. DIAMOND   2,048,108
MEANS FOR APPLYING BELT FASTENERS AND THE LIKE
Filed May 7, 1934

INVENTOR.
James K. Diamond
BY
Chappell V. Earl
ATTORNEYS

Patented July 21, 1936

2,048,108

UNITED STATES PATENT OFFICE 2,048,108

MEANS FOR APPLYING BELT FASTENERS AND THE LIKE

James K. Diamond, Grand Rapids, Mich., assignor to Clipper Belt Lacer Company, Grand Rapids, Mich.

Application May 7, 1934, Serial No. 724,250

1 Claim. (Cl. 1—49.4)

This application is a continuation in part of my application, Serial No. 689,863, filed September 18, 1933, for Device for applying belt fasteners and the like.

The main objects of this invention are:

First, to provide an improved apparatus for applying belt fasteners to belts so that they are properly secured to the belt.

Second, to provide an implement for localizing the power of a device of this character adapted to be used in a vise.

Third, to provide an improved method of applying belt fasteners and the like.

Fourth, to provide a belt fastening apparatus which is simple and economical in its parts and very efficient and effective in operation.

Objects relating to details and economies of my invention will appear from the description to follow. The invention is defined and pointed out in the claim.

A structure which is a preferred embodiment of my invention is illustrated in the accompanying drawing, in which.

In the accompanying drawing, 1, 1 represent the jaws of a vise. As disclosed and claimed in my copending application referred to above, the fastener holder 2 is provided with a series of transverse slots 3 adapted to receive the bight portions of the belt lacing hooks or fasteners 4. These hooks or fasteners are of general U-shape, one arm being longer than the other, and they terminate in inwardly turned prongs 5. This type of belt lacer or fastener is very extensively used in industry.

Figures 4, 5:
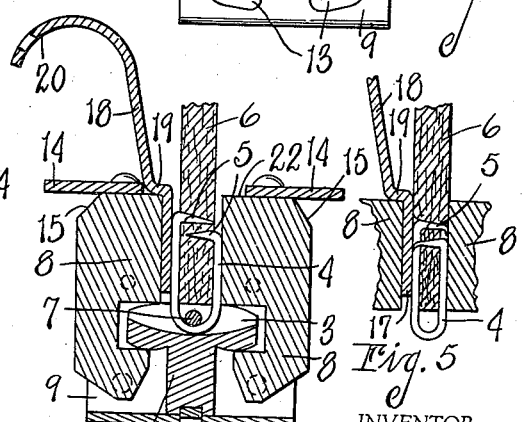
Fig. 4 is a transverse section on line 4—4 of Fig. 2, the parts being shown with the jaws in an intermediate position.
Fig. 5 is a fragmentary view similar to Fig. 4 showing the parts with the jaws closed.

A fragment of a belt is illustrated at 6, and in Fig. 5 I illustrate the fasteners in set position with their prongs properly embedded within the belt. The belt fasteners are retained within the holder by means of the locking pin 7 which is arranged through a longitudinal bore in the holder spaced from the bottom of the slots so that the locking pin engages within the bights of the fasteners as shown by Fig. 4.

The opposed coacting jaws 8, 8 are arranged between the end plates 9, 9 for coaction with the holder 2, the ends of the jaws being provided with pins 10 and 11 coacting with the cammed slots or portions 12 and 13, the arrangement being such that the faces of the jaws are substantially parallel in their final closing movement.

Figure 1:
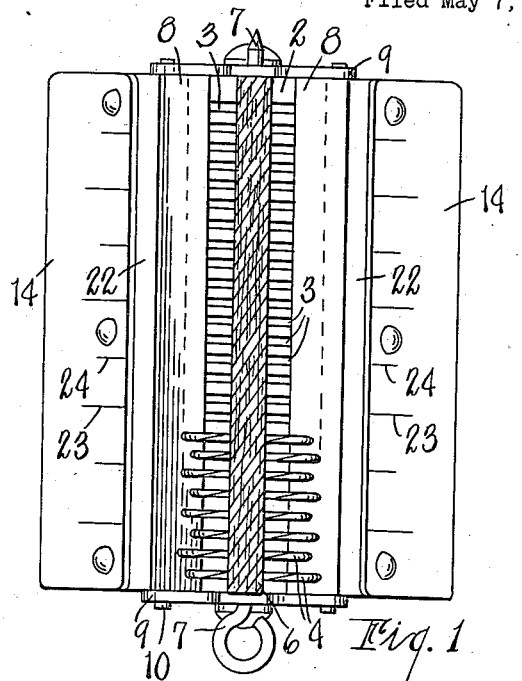
Fig. 1 is a top plan view of a belt fastener device embodying features of my invention, a partial load of belt lacing hooks or fasteners being shown therein to illustrate the relation of the hooks to the operating parts.
Figure 6:
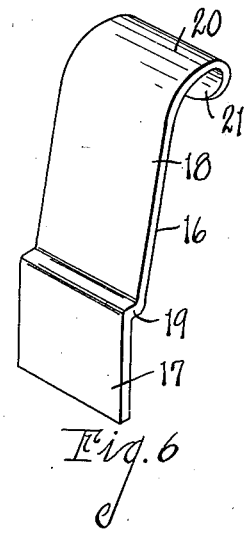
Fig. 6 is a perspective view of one member of the apparatus.
Figure 2:
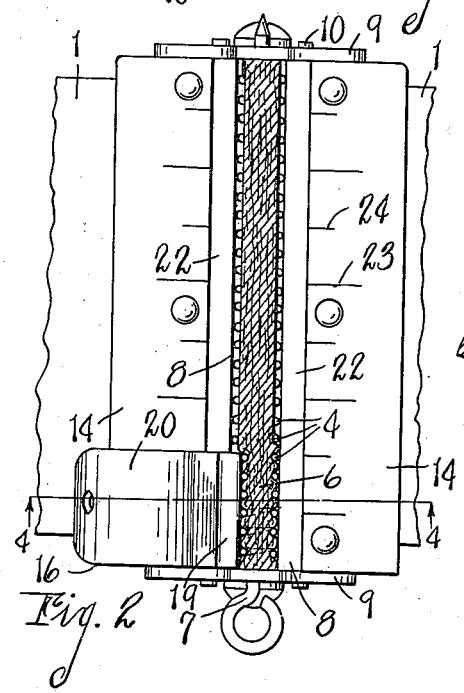
Fig. 2 is a top plan view of the apparatus with the jaws closed, a portion of the fasteners being completely set.
Figure 3:
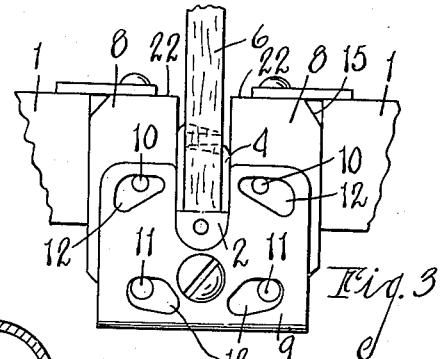
Fig. 3 is an end elevation, fragments of the belt and vise being shown.

The jaws are provided with members 14, 14 secured to the upper sides thereof and adapted to rest upon the jaws of the vise as shown in Figs. 2 and 3 supporting the device in position for positioning the belt and for closing the vise. The jaws are preferably cut away or beveled at their upper outer corners as at 15, thus facilitating the positioning of the device in the vise.

It requires an enormous amount of power to operate the jaws of the vise to properly set the hooks and their prongs in the belt and while considerable power is developed by the vises in general use I provide means for utilizing such power in a localized area. Such means in the illustrated embodiment of my invention comprises an implement or tool 16 preferably formed of flat metal of uniform width and thickness, the width of my implement being a fraction of the length of the jaws 8 or width of the belt 6. My implement 16 comprises a flat blade 17 and an inclined shank 18.

The shank 18 is connected to the blade by an offset 19 formed integrally with the blade and shank and extending at a right angle from the upper edge of the blade, the shank extending upwardly and rearwardly from the offset. The shank terminates in an arched grip 20 extending rearwardly therefrom and having a rounded outer end 21.

The blade is flat for disposition adjacent the face of one of the jaws 8, as shown by Fig. 4, the offset 19 constituting a shoulder for disposition on the inner upper exposed edge 22 of such jaw, the vise jaw engaging members 14 at the top thereof being spaced from the inner edges of the jaws to provide the exposed edges 22. The thickness of the blade is preferably such that it is equal to substantially twice that of the fasteners or hooks 4 so that the latter are completely embedded in the belt 6 as shown by Fig. 5.

I calibrate the upper surfaces of the members 14 in terms of the width of the blade, the full width of the blade being indicated by the transverse long lines 23 and the half width by the short lines 24. The width of the blade is adapted to cover a predetermined number of the belt lacer hooks 4 as shown by Fig. 2, the whole pressure of the vise being localized on these hooks when the implement is used as shown by Figs. 2, 4 and 5.

My implement is used to traverse the whole length of the jaws in a series of steps, each step localizing the power of the jaws on only a few of the total number of hooks so that they are properly set in the belt, the pointed ends of the hooks being clinched as shown by Fig. 5.

My improved belt lacing apparatus is very simple and economical in structure and is especially designed by me for use in the smaller plants where it is not desired to install larger machines such, for example, as that shown in Letters Patent No. 1,657,616, dated January 31, 1928.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent, is:

An integral metal implement for use with a belt lacer apparatus of the class described and the like, comprising a flat blade, an offset extending at a right angle from the upper edge of said blade, an inclined shank extending upwardly and rearwardly from said offset, and an arched grip extending rearwardly from said shank, said implement having the same thickness throughout and the same width with the exception of the beveled outer end of said grip.

JAMES K. DIAMOND.